United States Patent
Choi et al.

(10) Patent No.: US 11,432,109 B2
(45) Date of Patent: Aug. 30, 2022

(54) POSITIONING OF VEHICLES AND PEDESTRIANS LEVERAGING RANGING SIGNAL

(71) Applicant: QUALCOMM Incorporated, San Diego, CA (US)

(72) Inventors: Chang-Sik Choi, Hillsborough, NJ (US); Kapil Gulati, Hillsborough, NJ (US); Sudhir Kumar Baghel, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/698,295

(22) Filed: Nov. 27, 2019

(65) Prior Publication Data
US 2021/0160656 A1 May 27, 2021

(51) Int. Cl.
*H04W 4/02* (2018.01)
*H04W 4/029* (2018.01)

(52) U.S. Cl.
CPC .......... *H04W 4/023* (2013.01); *H04W 4/029* (2018.02)

(58) Field of Classification Search
CPC . H04W 76/14; H04W 4/023; H04W 72/0446; H04W 28/02; H04W 72/14;
(Continued)

(56) References Cited

U.S. PATENT DOCUMENTS 5,646,630 A * 7/1997 Sheynblat ............. G01S 19/071
342/357.31
6,121,928 A * 9/2000 Sheynblat ............. G01S 19/071
342/450
(Continued)

FOREIGN PATENT DOCUMENTS

KR        101318576 B1 * 10/2013 ........... G01S 5/0236
WO   WO2003060547 A1 *  7/2003
(Continued)

OTHER PUBLICATIONS

A layered architecture for location-based services in wireless ad hoc networks by Agre • A. Akinyemi • Lusheng Ji • R. Masuoka • P. Thakkar Published in: Proceedings, IEEE Aerospace Conference (vol. 3, p. 3) Jan. 2002 (Year: 2002).*
(Continued)

*Primary Examiner* — William D Cumming
(74) *Attorney, Agent, or Firm* — Satheesh Karra

(57) ABSTRACT

A target user equipment (UE), which may be a vehicle or UE carried by a pedestrian, may receive sequentially broadcast ranging signals from a set of ranging source entities (SEs), which may be road side units or other vehicles. The target UE further receives location information separately broadcast by each SEs. The location information, for example, may include the position for the SE, the time of transmission of the ranging signals transmitted by the SE and/or a sequence identifier for the SE. The target UE may determine ranges to the SEs using time of arrival measurements for the ranging signals and the time of transmissions of the ranging signals or the sequence identifier received in the location information. The position of the target UE may be determined using the determined ranges to the SEs and the positions of the SEs received in the location information.

26 Claims, 6 Drawing Sheets

(58) Field of Classification Search
CPC ....... H04W 16/14; H04W 4/40; H04W 36/24; H04W 72/1278; H04W 76/50; H04W 4/33; H04W 64/00; H04W 52/46
USPC ...... 455/456.3, 456.1; 370/320, 328, 357.41, 370/254, 326

See application file for complete search history.

(56) References Cited

U.S. PATENT DOCUMENTS

| | | | |
|---|---|---|---|
| 6,271,788 B1* | 8/2001 | Longaker | G01S 19/071 342/464 |
| 7,203,497 B2* | 4/2007 | Belcea | H04L 67/12 340/539.2 |
| 7,450,063 B2* | 11/2008 | Kangas | G01S 19/09 342/357.46 |
| 7,656,349 B2* | 2/2010 | Feller | G01S 19/06 342/357.41 |
| 8,085,704 B2* | 12/2011 | Kangas | G01S 19/252 370/320 |
| 8,150,420 B2* | 4/2012 | Sun | G01S 5/14 455/414.3 |
| 9,176,217 B2* | 11/2015 | Krasner | G01S 5/0263 |
| 9,439,039 B1* | 9/2016 | Patil | H04W 4/023 |
| 10,015,769 B1* | 7/2018 | Younis | G01S 5/10 |
| 10,038,979 B1* | 7/2018 | Jiang | H04W 56/006 |
| 10,349,442 B2* | 7/2019 | Baghel | H04W 76/14 |
| 10,484,957 B2* | 11/2019 | Younis | G01S 5/10 |
| 2004/0258013 A1* | 12/2004 | Belcea | H04L 67/12 370/254 |
| 2007/0139264 A1* | 6/2007 | Kangas | G01S 19/42 342/357.46 |
| 2007/0149206 A1* | 6/2007 | Wang | H04W 36/0085 455/450 |
| 2009/0028088 A1* | 1/2009 | Kangas | G01S 19/252 370/326 |
| 2010/0062793 A1* | 3/2010 | Sun | G01S 5/0284 455/456.3 |
| 2013/0003695 A1* | 1/2013 | Nylander | H04W 36/00837 370/331 |
| 2014/0329536 A1* | 11/2014 | Tian | G01S 1/20 455/456.1 |
| 2014/0368321 A1* | 12/2014 | Namgoong | G01S 5/0226 340/10.5 |
| 2018/0049014 A1* | 2/2018 | Patil | H04W 4/40 |
| 2018/0049235 A1* | 2/2018 | Baghel | H04W 72/1289 |
| 2018/0217613 A1* | 8/2018 | Jiang | G08G 1/163 |
| 2018/0220263 A1* | 8/2018 | Jiang | H04W 4/023 |
| 2018/0310272 A1* | 10/2018 | Younis | G01S 5/10 |
| 2018/0365909 A1* | 12/2018 | Cheng | H04W 4/40 |
| 2019/0110325 A1* | 4/2019 | Gulati | H04L 5/0032 |
| 2019/0141573 A1* | 5/2019 | Boström | H04W 4/40 |
| 2019/0190588 A1* | 6/2019 | Higgins | H04B 7/0413 |
| 2019/0208387 A1* | 7/2019 | Jiang | H04W 72/044 |
| 2019/0245656 A1* | 8/2019 | Baghel | H04W 4/40 |
| 2019/0281603 A1* | 9/2019 | Oh | H04B 17/318 |
| 2019/0311625 A1* | 10/2019 | Anvari | G08G 1/165 |
| 2020/0062267 A1* | 2/2020 | Magzimof | G05D 1/0038 |
| 2020/0077319 A1* | 3/2020 | Lun | H04W 36/30 |
| 2020/0162879 A1* | 5/2020 | Lotfallah | H04W 36/14 |
| 2020/0217918 A1* | 7/2020 | Ryden | G01S 5/0236 |
| 2020/0229121 A1* | 7/2020 | Younis | G01S 5/10 |
| 2020/0298714 A1* | 9/2020 | Widmer | B60L 53/30 |
| 2021/0160656 A1* | 5/2021 | Choi | G01S 1/24 |
| 2022/0039052 A1* | 2/2022 | Choi | H04W 4/06 |
| 2022/0045807 A1* | 2/2022 | Wu | H04W 52/262 |
| 2022/0046382 A1* | 2/2022 | Choi | G01S 11/02 |
| 2022/0046467 A1* | 2/2022 | Zhang | H04W 74/0808 |
| 2022/0053422 A1* | 2/2022 | Choi | H04W 4/46 |
| 2022/0132462 A1* | 4/2022 | Balasu | H04W 4/40 |

FOREIGN PATENT DOCUMENTS

| | | | |
|---|---|---|---|
| WO | 2017023474 A1 | 2/2017 | |
| WO | 2018106467 A1 | 6/2018 | |
| WO | WO-2022035489 A1 * | 2/2022 | ............ H04W 4/023 |

OTHER PUBLICATIONS

S. S. Cherian and A. N. Rudrapatna, "LTE location technologies and delivery solutions," in Bell Labs Technical Journal, vol. 18, No. 2, pp. 175-194, Sep. 2013, doi: 10.1002/bltj.21612. (Year: 2013).*

J. Agre, A. Akinyemi, Lusheng Ji, R. Masuoka and p. Thakkar, "A layered architecture for location-based services in wireless ad hoc networks," Proceedings, IEEE Aerospace Conference, 2002, pp. 3-3, doi: 10.1109/AERO.2002.1035238. (Year: 2002).*

Hoang G.M., et al., "Cooperative Localization in GNSS-Aided VANETs with Accurate IR-UWB Range Measurements", 2016 13TH Workshop on Positioning, Navigation and Communications (WPNC), IEEE, Oct. 19, 2016 (Oct. 19, 2016), pp. 1-6, XP033046093, DOI: 10.1109/WPNC.2016.7822848 [retrieved on Jan. 17, 2017], Section I, Whole Document.

International Search Report and Written Opinion—PCT/US2020/070817—ISA/EPO—dated Mar. 15, 2021.

\* cited by examiner

POSITIONING OF VEHICLES AND PEDESTRIANS LEVERAGING RANGING SIGNAL

BACKGROUND

Background Field

The subject matter disclosed herein relates to wireless communications systems, and more particularly to methods and apparatuses for location determination of a user equipment in a wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unavailable, e.g., in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

To increase the accuracy of location determination it may be desirable to use signals from one or more terrestrial sources. For example, signals for determining a range to stationary roadside units or from moving vehicles with known locations may be used by a target vehicle or pedestrian for positioning. Round trip time (RTT), for example, is a technique commonly used for determining a position of a target vehicle or pedestrian. RTT is a two-way messaging technique in which the time between sending a signal from a first device to receiving an acknowledgement from a second device (minus processing delays) corresponds to the distance (range) between the two devices. While RTT is accurate, it would be desirable to reduce the power consumption required by two way messaging.

SUMMARY

A target user equipment (UE), which may be a vehicle or UE carried by a pedestrian, may receive sequentially broadcast ranging signals from a set of ranging source entities (SEs), which may be road side units or other vehicles. The ranging signals may be wide band signals with contiguous or non-contiguous frequency channels. The target UE further receives location information separately broadcast by each SEs. The location information, for example, may include the position for the SE, the time of transmission of the ranging signals transmitted by the SE and/or a sequence identifier for the SE. The target UE may determine ranges to the SEs using time of arrival measurements for the ranging signals and the time of transmissions of the ranging signals or the sequence identifier received in the location information. The position of the target UE may be determined using the determined ranges to the SEs and the positions of the SEs received in the location information.

In one implementation, a method of performing location determination by a user equipment (UE), includes receiving a ranging signal broadcast by each entity in a plurality of entities in a wireless network; receiving a message with location information that is broadcast from each entity in the plurality of entities; determining a range to each entity using the ranging signal received from each entity and the location information received from each entity; and determining a position of the user equipment based on the range to each entity and a known location of each entity.

In one implementation, a user equipment (UE) configured to support location determination includes a wireless transceiver configured to receive broadcast signals from entities in a wireless network; at least one memory; and at least one processor coupled to the wireless transceiver and the at least one memory, the at least one processor configured to: receive a ranging signal broadcast by each entity in a plurality of entities in a wireless network; receive a message with location information that is broadcast from each entity in the plurality of entities; determine a range to each entity using the ranging signal received from each entity and the location information received from each entity; and determine a position of the user equipment based on the range to each entity and a known location of each entity.

In one implementation, a user equipment (UE) configured to support location determination includes means for receiving a ranging signal broadcast by each entity in a plurality of entities in a wireless network; means for receiving a message with location information that is broadcast from each entity in the plurality of entities; means for determining a range to each entity using the ranging signal received from each entity and the location information received from each entity; and means for determining a position of the user equipment based on the range to each entity and a known location of each entity.

In one implementation, a non-transitory computer readable medium including program code stored thereon, the program code is operable to configure at least one processor in a user equipment (UE) for performing location determination comprising program code to receive a ranging signal broadcast by each entity in a plurality of entities in a wireless network; program code to receive a message with location information that is broadcast from each entity in the plurality of entities; program code to determine a range to each entity using the ranging signal received from each entity and the location information received from each entity; and program code to determine a position of the user equipment based on the range to each entity and a known location of each entity.

In one implementation, a method of supporting location determination of a user equipment (UE) performed by an entity in a wireless network, includes determining an available portion of a wireless spectrum by the entity, wherein the entity is one of a plurality of ranging sources for the UE; generating a ranging signal over the available portion of the wireless spectrum; broadcasting the ranging signal to be received by the UE; and broadcasting a message with location information related to the ranging signal.

In one implementation, an entity in a wireless network capable of supporting location determination of a user equipment (UE) includes a wireless transceiver configured to broadcast signals to a UE in a wireless network; at least one memory; and at least one processor coupled to the wireless transceiver and the at least one memory, the at least one processor configured to: determine an available portion of a wireless spectrum by the entity, wherein the entity is one of a plurality of ranging sources for the UE; generate a ranging signal over the available portion of the wireless spectrum; broadcast the ranging signal to be received by the UE; and broadcast a message with location information related to the ranging signal.

In one implementation, an entity in a wireless network capable of supporting location determination of a user equipment (UE) includes means for determining an available portion of a wireless spectrum by the entity, wherein the entity is one of a plurality of ranging sources for the UE; means for generating a ranging signal over the available portion of the wireless spectrum; means for broadcasting the ranging signal to be received by the UE; and means for broadcasting a message with location information related to the ranging signal.

In one implementation, a non-transitory computer readable medium including program code stored thereon, the program code is operable to configure at least one processor in an entity in a wireless network user equipment (UE) for supporting location determination of a user equipment (UE) includes program code to determine an available portion of a wireless spectrum by the entity, wherein the entity is one of a plurality of ranging sources for the UE; program code to generate a ranging signal over the available portion of the wireless spectrum; program code to broadcast the ranging signal to be received by the UE; and program code to broadcast a message with location information related to the ranging signal.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Positioning for target vehicles or pedestrians may use single-sided ranging signals from transmitters having known positions, such as stationary roadside units (RUs) or moving vehicles that have known positions. Use of single-sided ranging signals reduces power consumption compared to conventional ranging approaches, such as round-trip-time (RTT) techniques as an acknowledgement signal is not required to be transmitted or received.

Figure 1:
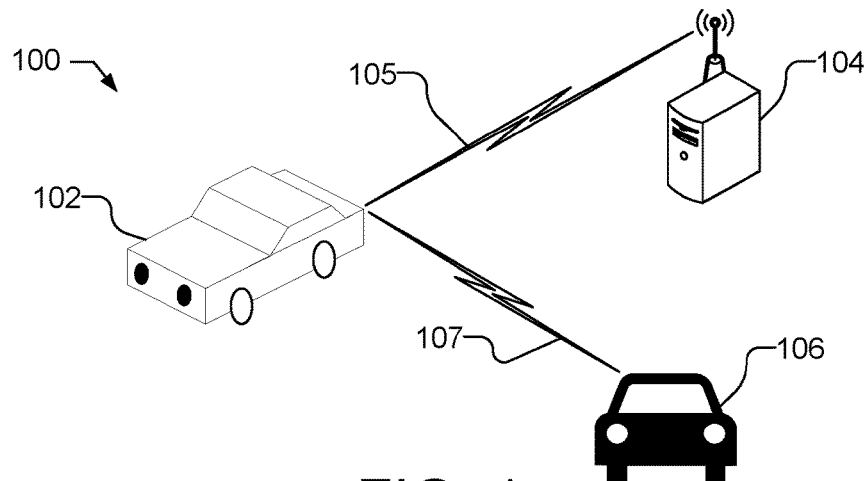
FIG. 1 illustrates a wireless communication system in which a target user equipment (UE), illustrated as a vehicle, is in wireless communications with other entities in the wireless communication system.

To improve ranging performance and to reduce channel access overheads, participating entities may be clustered for sequential transmissions of their ranging signals. The ranging signals may be a wideband waveform with multiple contiguous or non-contiguous channels. After broadcasting a ranging signal, each entity may further broadcast a message including location information, such as the entity's position, sequence ID, and time when the ranging signal was transmitted, so that the target device may determine the range to the entity, FIG. 1 illustrates a wireless communication system 100 in which a target user equipment (UE) 102, illustrated as a vehicle, is in wireless communications with other entities 104 and 106 in the wireless communication system 100. As illustrated, the target IJE 102 may directly communicate with entity 104, which is illustrated as a road side unit (RSU) 104, using a Vehicle-to-Infrastructure (V2I) communication link 105, and entity 106, which is illustrated as another vehicle 106, using a Vehicle-to-Vehicle (V2V) communication link 107. A road side unit (RSU) is a stationary infrastructure entity, that may support V2X applications and that can exchange messages with other entities supporting V2X applications. An RSU may be a logical entity that may combine V2X application logic with the functionality of base stations in a Radio Access Network (RAN), such as an evolved Node B (eNB) or next generation evolved Node B (ng-eNB) in LTE wireless access and/or evolved LTE (eLTE) wireless access (referred to as eNB-type RSU) or a NR Node B (gNB) in Fifth Generation (5G) wireless access, or a user equipment (UE) (referred to as UE-type RSU). The target UE 102 may communicate with additional entities, such as additional RSUs, vehicles, or pedestrians (not shown), e.g., in a Vehicle-to-Pedestrian (V2P) communication link.

The wireless communication may be over, e.g., Proximity-based Services (Prose) Direction Communication (PC5) reference point as defined in Third Generation Partnership Project (3GPP) Technical Specification (TS) 23.303, and may use wireless communications under IEEE 1609, Wireless Access in Vehicular. Environments (WAVE), Intelligent Transport Systems (ITS), and IEEE 802.11p, on the ITS band of 5.9 Gliz, or other wireless connections directly between entities.

For positioning of the target UE 102, the ranging sources equipment (SEs), e.g., entities 104 and 106, may transmit single-sided ranging signals, i.e., no acknowledgement message is transmitted in response to the ranging signal. The ranging signals, for for example, may be transmitted on an unlicensed spectrum. Conventionally, transmission on an unlicensed spectrum is subject to Listen Before Talk (LBT) procedures prior to transmission. For example, typically, prior to transmission on a medium, radio transmitters are required to first sense the medium and transmit only if the medium is sensed to be idle, sometimes referred to as clear channel assessment (CCA). If all the SEs, e.g., RSUs 104 and vehicles 106, transmit their ranging signals independently, each will be separately required to perform LBT procedure before transmission, resulting in inefficient channel access and possibly prohibiting the distributions of ranging signals in a timely manner.

Due to the mobility of target UE 102, which may be, e.g., a vehicle or pedestrian, as well as possible mobility of SEs, e.g., vehicle 106, the multiple ranging signals should arrive at the target UE 102 within a reasonably small window of time, i.e., so that an acceptably small amount of movement of the target UE 102 (or SE) occurs between reception of ranging signals; otherwise the ranging performance may degrade. Furthermore, the overhead of LBT procedures scales with respect to the number of entities. Therefore, in order to improve ranging performance and to reduce channel access overheads, the participating entities SEs) are clustered for sequential transmissions of their ranging signals.

Additionally, the unlicensed spectrum may be built of component channels, e.g., 80 MHz unlicensed spectrum has components of 4×20 Mhz channels, and 2×40 Mhz channels. Other wireless nodes maybe transmitting on any of the component channels at any given time. For example, the entire 80 MHz, or one or more 20 MHz channels, or one of more 40 Hz channels maybe occupied. In order to avoid interfering with transmissions from other wireless nodes, the SEs may use a subset of the 20 MHz component channels that are free for transmission, e.g., as determined by a single SE, e.g., the first or head SE in the cluster of SEs.

The target UE 102 monitors the time of arrival (TOA) of each single-sided ranging signal, but the transmission time of the ranging signals are unknown to the target UE 102. Accordingly, in addition to broadcasting the ranging signals, the SEs broadcast location information that may be used by the target UE 102 to determine the range to to each SE. For example, an SE may broadcast the exact time that the ranging signal was transmitted, which the target UE 102 may use along with the TOA of the ranging signal to determine the time of flight, which can be converted to a range to the SE. Thus, the target UE 102 may monitor the channel(s) for ranging signals all the time. Close in time to, e.g., before or after, the broadcast of a ranging signal from an SE, each SE sends location information for its ranging signal. The location information, for example, may include the time of transmission of the ranging signal, the position of the SE, bandwidth used in the ranging signal or other configuration information, etc. Using the location information for the ranging signal from the SE, e.g., the time of transmission of the ranging signal, and using the time of arrival of the ranging signal measured by the target UE 102, the target UE 102 may back calculate the time of flight of the ranging signal and, thus, the range to each SE.

In some implementations, the location information broadcast by one or more SEs may include a sequence identifier for the SE in addition or instead of the time of transmission of the ranging signal, e.g., if the location information is transmitted by one or more SEs before broadcasting the ranging signals. The sequence identifier indicates the SEs position in the sequence of broadcasts of the ranging signal from the cluster of SEs. The sequence identifier seq $\#_i$ for an $SE_i$, for example, may be used by the target UE 102 to calculate the time of transmission of the ranging signal from that $SE_i$, e.g., if the time of transmission is not included in the location information. For example, the target HE 102 may be provided with the time of transmission $T_0$ of the first ranging signal, e.g., in the location information from the first or head SE, as well as the time $T_{trans}$ between each ranging signal transmission. The time of transmission of any SE may then be determined, e.g., as $T_0+(\text{seq }\#_i*T_{trans})$.

The location information broadcast by the SE may further include, e.g., the location of the SE. Additionally, in some implementations, the SE may further include in the location information, or in a different message, a TOA of one or more ranging signals from other SEs as measured by the SE. The location information may be transmitted by the SE in a licensed spectrum, e.g., in an Intelligent Transport Systems (ITS) spectrum.

Figure 2:
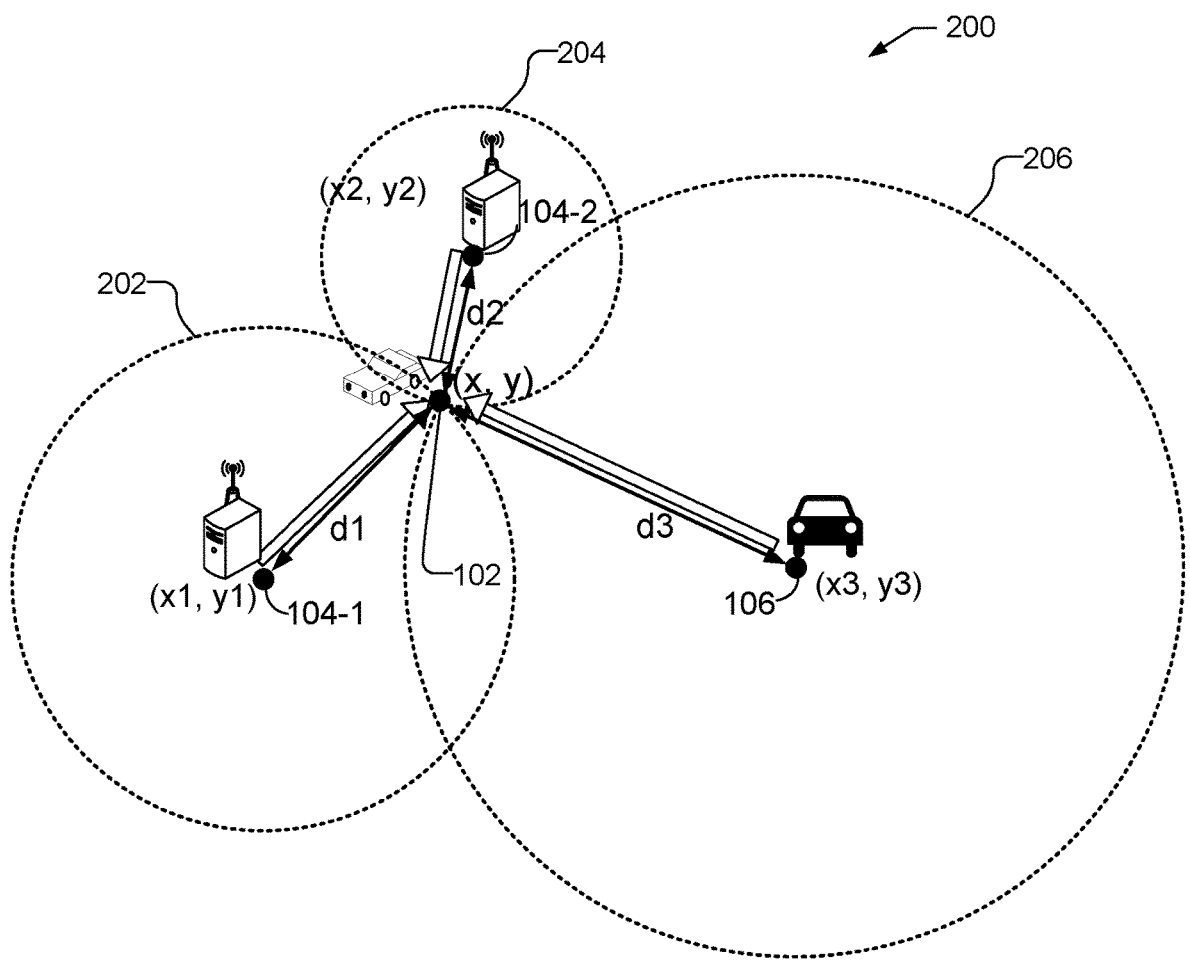
FIG. 2 illustrates a simplified environment and an exemplary technique for determining a position of target UE using single-sided ranging signals from multiple entities in a wireless communication system.

FIG. 2 illustrates a simplified environment and an exemplary technique for determining a position of target UE 102 using single-sided ranging signals from multiple entities in a wireless communication system 200. The target UE 102 may communicate wirelessly with SEs including a first RSU 104-1, a second RSU 104-2, and another vehicle 106, which has a known location using radio frequency (RF) signals and standardized protocols for the modulation of the RF signals and the exchanging of information packets. By extracting different types of information from the exchanged signals, and utilizing the layout of the network (i.e., the network geometry), the target UE 102 may determine its position in a predefined reference coordinate system. As shown in FIG. 2, the target UE 102 may specify its position (x, y) using a two-dimensional coordinate system; however, the aspects disclosed herein are not so limited, and may also be applicable to determining positions using a three-dimensional coordinate system, if the extra dimension is desired. Additionally while three entities are shown in FIG. 2, aspects may utilize additional entities. For example, three SEs may be used to determine a position (x, y) in a two-dimensional coordinate system, while four or more SEs may be used to determine a position (x, y, z) in a three-dimensional coordinate system. In some implementations, however, fewer than three SEs may be used, e.g., along with SPS positioning or another positioning system, to determine a precise position of the target UE. For example, if the SPS positioning produces a relatively imprecise position for the target UE, ranging signals from two SEs, or a single SE, may be used to improve the precision of the position for the target UE.

In order to determine its position (x, y), the target UE 102 needs to determine a range (distance) (dk, where k=1, 2, 3) to each entity 104-1, 104-2, and 106, and the network geometry. The network geometry may include the positions of each of the entities 104-1, 104-2, and 106 in a reference coordinate system ((xk,yk), where k=1, 2, 3).

As illustrated, each SE 104-1, 104-2, and 106 broadcasts RF signals 201, 202, and 203, respectively, that are received by the target UE 102. The RF signals 201, 202, and 203 include the single-sided ranging signal from each entity 104-1, 104-2, and 106. The ranging signal, for example, may be Positioning Reference Signal (PRS) or Sounding Reference Signal (SRS) used in Long Term Evolution (LTE) as defined in 3GPP. As discussed above, the target UE 102 may measure the TOA of the ranging signals. The each SE 104-1, 104-2, and 106 further broadcasts location information with which the target UE can determine the time of flight of the ranging signals. For example, the location information may include the time of transmission and/or the sequence identifier for the SE from which the time of transmission may be determined.

Using the time of flight of the ranging signals, the distance between the target UE 102 and the SEs may be determined, e.g., based on the speed of the light. Thus, as illustrated in FIG. 2, the range (distance) (dk, where k=1, 2, 3) to each entity 104-1, 104-2, and 106 can be determined. Once each distance is determined, and the network geometry is known, e.g., the positions (xk, yk), where k=1, 2, 3 of each of the entities 104-1, 104-2, and 106 is known, the target UE 102 can then solve for its position (x, y) by using a variety of known geometric techniques, such as, for example, trilateration. From FIG. 2, it can be seen that the position of the target UE 102 ideally lies at the common intersection of all of the circles 202, 204, and 206 drawn using dotted lines. Each circle being defined by radius dk and center (xk, yk), where k=1, 2, 3. In practice, the intersection of these circles may not lie at a single point due to the noise and other errors in the networking system. The network geometry, e.g., the positions (xk, yk), where k=1, 2, 3 of each of the entities 104-1, 104-2, and 106, may also be provided in the broadcast location information. Using the positions of the entities 104-1, 104-2, and 106 and the intersections of the circles 202, 204, and 206 around the SEs 104-1, 104-2, and 106, the position of the target UE 102 may be determined.

In some implementations, the single-sided ranging signals may be used along with other types of positioning procedures. For example, the single-sided ranging signals and positioning may be used with SPS positioning. For example, if a relatively imprecise position, e.g., with an error of a few meter, has been acquired for the target UE using SPS, single sided ranging signals and positioning may be used to improve the acquired position, e.g., reducing the error to several tens of centimeters.

To generate the ranging signals to be used by the target UE 102, a cluster or set of ranging SEs is established. For example, referring to FIG. 2, a set of SEs may be established as the road side units 104-1, 104-2 and vehicle 106. In some implementations, the set of SEs, for example, may be capable of transmission of ranging waveforms in an unlicensed spectrum and transmission of location information in a licensed spectrum. The set of SEs, for example, may be physically near each other. The set of SEs may be a set of one, i.e., the set may include a single road side unit 104 or a single vehicle 106.

The set of SEs may include a head SE, e.g., RSU 104-1 in FIG. 2, which may be arbitrarily chosen or may be chosen pursuant to predetermined criteria. For example, particular road side units may be given priority as head SEs. The head SE 104-1 may be enabled to sense the receive signal powers of channels (frequency resources) in the spectrum on which the ranging signals will be transmitted, which may be unlicensed. The head SE 104-1 detects the energy levels for the different channels in the spectrum. The head SE 104-1 generates a wide-band ranging signal, which may be short duration, based on the detected energy levels of the different channels. The ranging waveform may consist of one or more unoccupied channels. If a channel or channels are deemed to be "occupied," the ranging waveform is generated by puncturing the occupied channel(s), i.e., the ranging waveform generated without the occupied channels so that the ranging waveform only uses "unoccupied" or "free" channels. Thus, the ranging waveform may include multiple channels, which may be contiguous or non-contiguous. Generated ranging signals may be transmitted on demand or may be transmitted multiple times, e.g., periodically, by the set of SEs, where the ranging signals may have the same configuration of channels or may have a different configuration of channels.

The generated ranging signal may include a preamble including an indication that the channels used in the ranging signal, and that the channels will be occupied for a period of time, e.g., the time that it will take for each SE in the set of SEs to sequentially transmit their individual ranging signals. For example, if each ranging signal is 2 ms long, and there are five SEs in the set of SEs that will sequentially transmit their ranging signals, the preamble may indicate that channels will be occupied for 10 ms, or slightly longer to accommodate some additional configuration time for the SEs to acknowledge the ranging signals transmitted in the cluster.

Each non-head SE in the set of SEs, RSU 104-2 and vehicle 106, may be arbitrarily assigned a sequence identifier, indicating the SEs positioning in the sequence of ranging signal transmissions. For example, in one implementation, the sequence of SEs may be based, in part, on a pre-determined identity of each SE that may be assigned (or self-assigned) prior to the procedure. For example, the predetermined identity may be determined as Layer 2 identifier (L2 ID) mod #SEs. By way of example, in FIG. 2, RSU 104-2 may be assigned the second position, e.g., the position immediately after the head SE 104-1, and vehicle 106 may be assigned the third position. Each SE 104-2 and vehicle 106 may determine the channels to be included in the ranging waveform from the broadcast ranging signal received from the head SE 104-1 (or from any preceding SE). The SEs 104-2 and vehicle 106, for example, may determine available channels, i.e., the portions of the wireless spectrum to be used for the ranging signal, by examining the ranging waveform from a preceding SE or by examining the preamble of the ranging signal from a preceding SE. Each SE 104-2 and 106 independent generates a ranging signal using the determined available channels. The ranging signal may be similar to PRS or SRS. In one implementation, the ranging signal may also depend in part on a pre-determined identity. For example, the ranging signal may be a base sequence with a cyclic shift that is determined as L2 ID mod N, where N is the code division multiplexing (CDM) factor (e.g., N=3 cyclic shifts per base sequence), Each SE 104-2 and 106 may further generate a preamble indicating the channels used in the ranging signal and, in some implementations, the remaining time that the channels will be occupied.

Each SE in the set of SEs broadcasts its own ranging signal in sequential order, based on the sequential identifier of the SE. The ranging signals, for example, may be broadcast sequentially at 160 MHz or other frequency. The ranging signals may be broadcast, for example, so that there is no temporal overlap of the ranging signals. The head SE 104-1 broadcasts its ranging signal, which may include a preamble. After detecting the first ranging signal from the head SE 104-1, the remaining SEs 104-2, 106 sequentially broadcast their own ranging signals, e.g., SE 104-2 broadcasts its ranging signal immediately after receiving the ranging signal from head SE 104-1, and SE 106 broadcasts its ranging signal at a time ((Seq #)*$T_{Trans}$) after receiving the ranging signal from head SE 104-1, where Seq # is the sequence number of the SE, and $T_{Trans}$ is the length of time to transmit each ranging signal. In some implementations, each remaining SE 104-2, 106 may broadcast its own ranging signal immediately after receiving the ranging signal from the immediately preceding SE, e.g., SE 104-2 broadcasts its ranging signal immediately after receiving the ranging signal from head SE 104-1, and SE 106 broadcasts its ranging signal immediately after receiving the ranging signal from SE 104-2.

Each SE in the set of SEs is further configured to broadcast location information to be used by the target UE 102, including information for the ranging signals and information for positioning, e.g., the position of the SE. The location information may include, e.g., the position of the SE, the sequence identifier for the SE, and/or the exact time when ranging signal was transmitted by the SE. The location information broadcast by each SE (or another message broadcast by one or more SEs) may include the TOA that the SE detected ranging signals from other SEs. The location information that is broadcast from each SE may be broadcast, e.g., in a licensed spectrum, e.g., Radio Resource Control (RRC) or Proximity-based Services (Prose) Direction Communication (PC5) signaling protocol stack (PC5-S) in Intelligent Transport Systems (ITS) spectrum, e.g., for Vehicle to Vehicle (V2V) messages, within a specific window of time. For example, the location information may be broadcast within 10-20 ms to minimize the size of the buffer required for the target UE 102. The location information may be broadcast in a spectrum that is different than that used for the ranging signals thereby avoiding interference between the ranging signals and the location information.

The target LIE 102 receives the sequentially broadcast ranging signals from each of the SEs 104-1, 104-2, and 106 in the set of SEs. The target UE 102 is configured to receive the separately broadcast location information from each SEs 104-1, 104-2, and 106, which may be broadcast by each SE after (or before) the SE transmits its ranging signal. The target UE 102 may use the received location information for each SE to analyze the ranging signal received from the corresponding SE. For example, the target UE 102 may use the transmit time for the ranging signal as indicated in the received location information and the measured receive time of the ranging signal to determine the time of flight of the ranging signal. The time of flight may then be converted into the range (distance) to the SE, e.g., by the time of flight divided by speed of light. If the transmit time for the ranging signal is not provided, the target UE 102 may determine the transmit time based on the sequence identifier for the SE, along with the known frequency of the ranging signals transmission and the time of the first transmission of the ranging signals, which may be provided by the head SE 104-1. Once the ranges to the SEs is determined, the target UE 102 may use the position of the SEs as indicated in the received location information along with the determined ranges to determine the position of the target UE 102, e.g., using trilateration. The target LIE 102 may further accurately derive its position by combining its relative position utilizing the ranging signals and a determined SPS position.

In some implementations, the target UE 102 may use the TOA measured by SEs along with its own TOA measurements to generate Received Signal Time Difference (RSTD) measurements. For example, SE 104-2 may provide, e.g., in the location information or in a separate message, a TOA measurement for the ranging signal that SE 104-2 received from SE 104-1, and similarly SE 106 may provide a TOA measurement for the ranging signal received by SE 106 from SE 104-1. Target UE 102 may use its own TOA measurements for the ranging signal from SE 104-1 to generate RSTD measurements. The position of the target UE 102 may accordingly be determined using RSTD, e.g., using Observed Time Difference of Arrival (OTDOA). For a precise position using RSTD, typically four or more SEs may be used.

Figure 3:
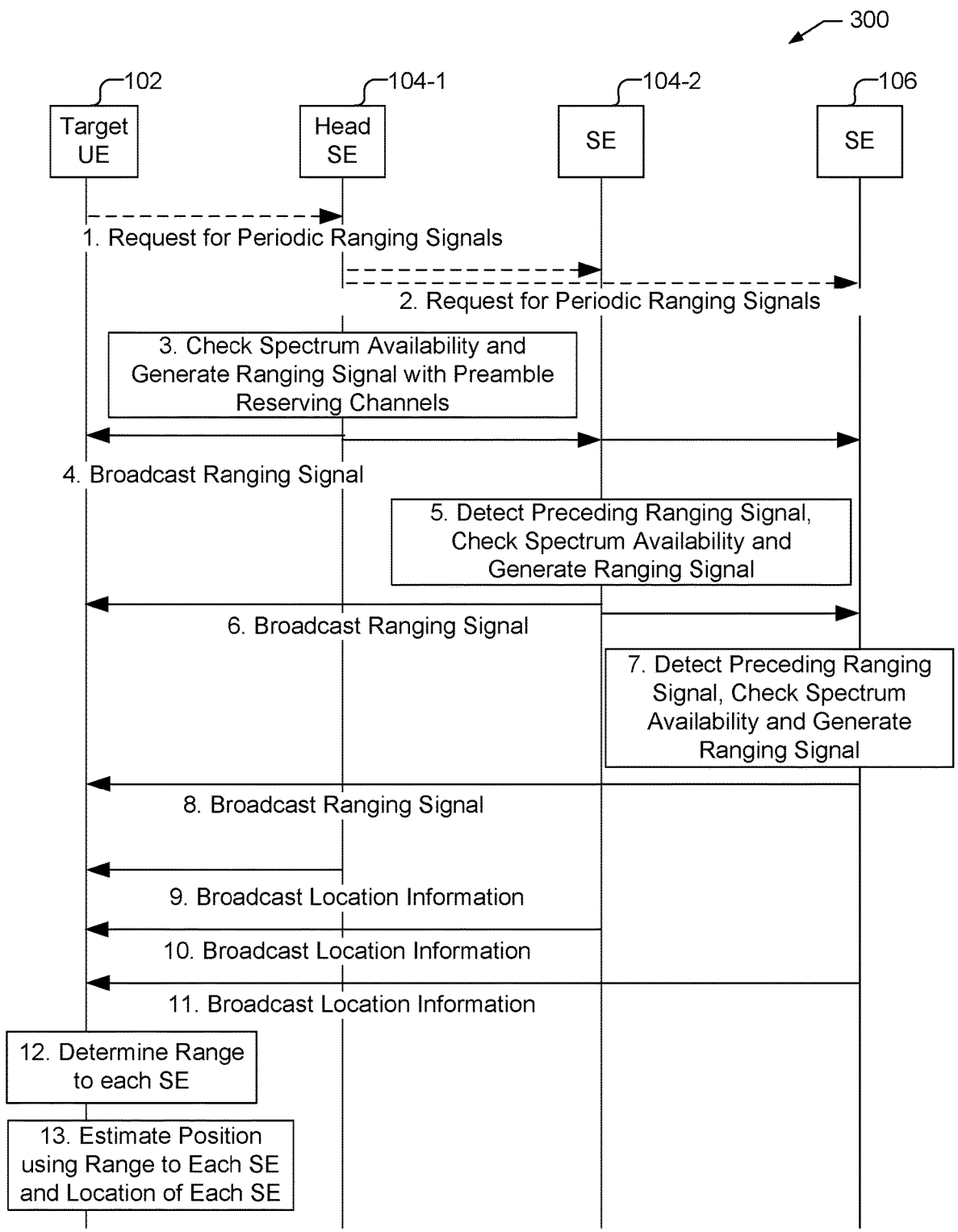
FIG. 3 illustrates an example of a call flow for a location determination session with a target UE and a set of entities in a wireless communication system.

FIG. 3 illustrates an example of a call flow 300 for a location determination session with UE 102 and a set of SEs including head SE 104-1 and SE 104-2, and SE 106. It should be understood that the target UE 102 may be in communication with one or more SEs prior to the initiation of a location determination session.

As illustrated, at stage 1, the target UE 102 may send a request for ranging signals to an SE, e.g., head. SE 104-1, which may be a request for periodic ranging signals or a request for on demand ranging signals.

At stage 2, the head SE 104-1 forms a set of SEs including SE 104-2 and SE 106 and provides a request for ranging signals to the SEs in the established set. The head SE 104-1, for example, may be determined to be the head SE in the set, based on previous contact with the target UE 102 (at stage 1) or other mechanism, e.g., based on the ability of the SE 104-1. The head SE 104-1 may provide information with which the SEs may identify their sequence numbers in the set of SEs, e.g., the head SE 104-1 may assign the sequence number to each SE, or may provide information with which each SE may determine its sequence number, e.g., head SE 104-1 may provide the number of SEs in the set and each SE may determine its sequence number as Layer 2 identifier (L2 ID) mod #SEs. In some implementations, the set may include on one SE, e.g., head SE 104-1.

At stage 3, the head SE 104-1 may check the availability of channels on the spectrum to be used for the ranging signals, e.g., by detecting energy levels for the different channels in the spectrum to determine if channels are occupied or free. The head SE 104-1 generates a ranging signal, e.g., using unoccupied or free channels and generates a preamble identifying the used channels and reserving the used channels for the duration of the sequential broadcast of ranging signals from the SEs.

At stage 4, the head SE 104-1 broadcasts the ranging signal, which is received by the target UE 102, as well as the other SEs in the set of SEs, i.e., SE 104-2 and SE 106. The ranging signal, which may be, e.g., a PRS or SRS signal, may be transmitted on an unlicensed spectrum, and may be a wide band signal using contiguous or non-contiguous channels. The target LE 102 measures the TOA of the ranging signal from the head SE 104-1.

At stage 5, the next SE 104-2 in the set of SEs determines the available channels in the spectrum, e.g., by detecting the channels used or the channels identified in the preamble of the ranging signal received at stage 4. The SE 104-2 generates a ranging signal using the available channels.

At stage 6, the SE 104-2 broadcasts the ranging signal, which is received by the target UE 102, as well as the other SEs in the set of SEs, i.e., SE 106. The ranging signal, which may be, e.g., a PRS or SRS signal, may be transmitted on an unlicensed spectrum, and may be a wide band signal using contiguous or non-contiguous channels. The target UE 102 measures the TOA of the ranging signal from the SE 104-2.

At stage 7, the next SE 106 in the set of SEs determines the available channels in the spectrum, e.g., by detecting the channels used or the channels identified in the preamble of the ranging signal received at stage 4 or stage 6. The SE 106 generates a ranging signal using the available channels.

At stage 8, the SE 106 broadcasts the ranging signal, which is received by the target UE 102, as well as any other SEs that may be included in the set of SEs, (not shown in FIG. 3). The ranging signal, which may be, e.g., a PRS or SRS signal, may be transmitted on an unlicensed spectrum, and may be a wide band signal using contiguous or non-contiguous channels. The target LTE 102 measures the TOA of the ranging signal from the SE 106.

At stage 9, the head SE 104-1 broadcasts the location information for SE 104-1, which is received by target UE 102. The location information may be transmitted on a licensed spectrum, such as an ITS spectrum. The location information may include, e.g., the position of the SE 104-1, the sequence identifier for the SE 104-1, the exact time when ranging signal was transmitted by the SE 104-1.

At stage 10, the SE 104-2 broadcasts the location information for SE 104-2, which is received by target UE 102. The location information may be transmitted on a licensed spectrum, such as an ITS spectrum. The location information may include, e.g., the position of the SE 104-2, the sequence identifier for the SE 104-2, the exact time when ranging signal was transmitted by the SE 104-2. The location information may further include the TOA of the ranging signal from head SE 104-1 detected by SE 104-2 at stage 4.

At stage 11, the SE 106 broadcasts the location information for SE 106, which is received by target UE 102. The location information may be transmitted on a licensed spectrum, such as an ITS spectrum. The location information may include, e.g., the position of the SE 106, the sequence identifier for the SE 106, the exact time when ranging signal was transmitted by the SE 106, The location information may further include the TOA of the ranging signal from head. SE 104-1 and/or SE 104-2 detected by SE 106 at stage 4 and/or stage 6.

At stage 12, the target UE 102 determines the range to each SE 104-1, 104-2, and 106. The target UE 102, for example, may use the TOA of the ranging signals measured at stages 4, 6, and 8 and the time of transmissions received in the location information at stages 9, 10, and 11 to determine the time of flight of each ranging signal which can be converted to a range (distance) to each SE 104-1, 104-2, and 106. In some implementations, IDA measurements by the target UE 102 and the time of transmissions from the SEs may be synchronized, e.g., using RTT method or may be estimated based on a Kalman filter. The target UE 102 may use the sequence identifier provided in location information at stages 9, 10, and 11, along with the frequency of the ranging signal transmissions and time of transmission of the ranging signal from the head SE 104-1 (which may be included in the preamble of ranging signal at stage 4 or in the location information received at stage 9) to determine the time of transmission of each ranging signal from SEs 104-2 and 106. In another implementation, the target UE 102 may use the TOAs for ranging signals measured by SEs as provided in location information at stages 9, 10, and 11 along with the TOAs measured by target UE 102 at stages 4, 6, and 8 to determine relative ranging signals, e.g., RSTD.

At stage 13, the target UE 102 may use the ranges determined at stage 12, along with the positions of the SEs 104-1, 104-2, and 106, received in the location information at stages 9, 10, and 11 to estimate the position of the target UE 102, e.g., using trilateration or other appropriate techniques. In some implementations, the target 102 may use the ranges determined at stage 12, along with the positions of the SEs 104-1, 104-2, and 106, received in the location information at stages 9, 10, and 11 to estimate a relative position of the target UE 102 which may be combined with a measured SPS position to derive an accurate position for the target UE 102.

Figure 4:
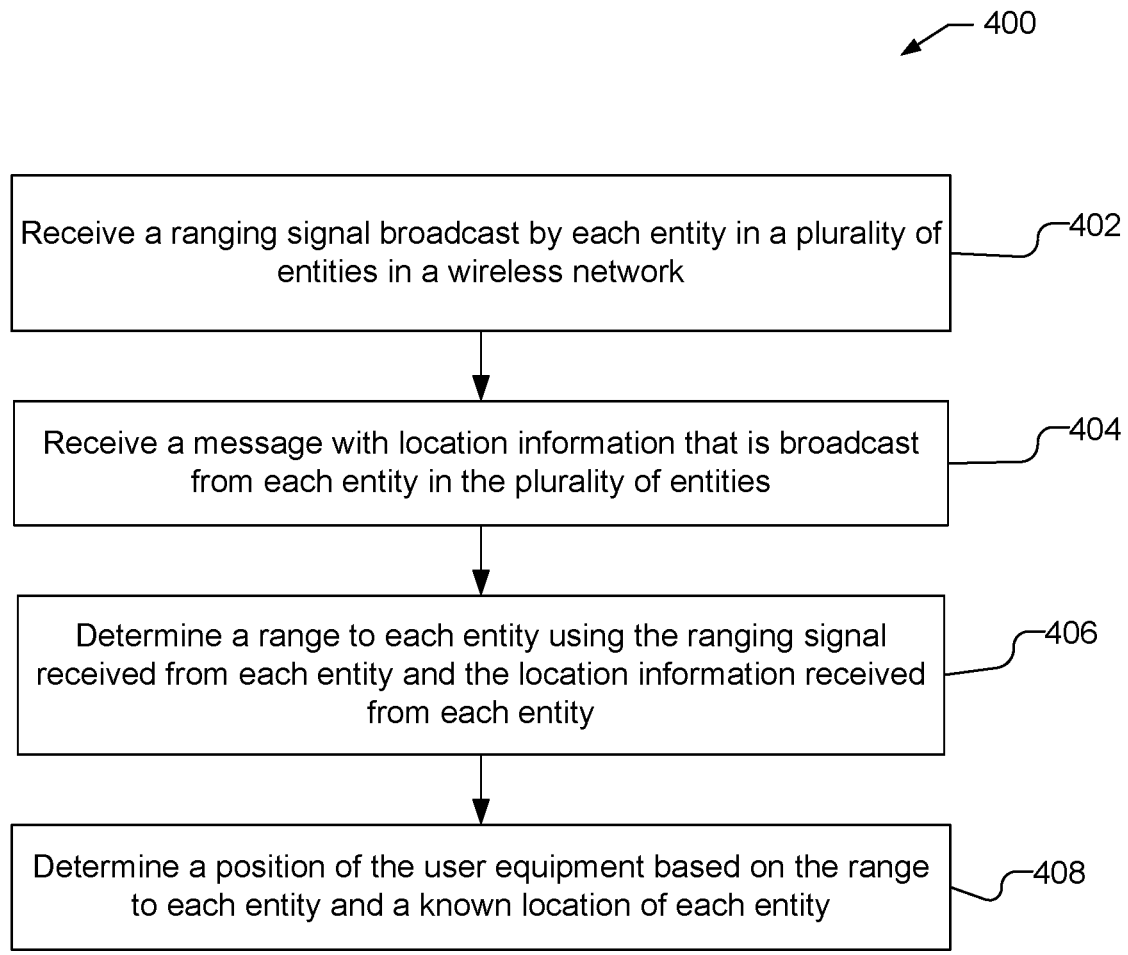
FIG. 4 is a flow chart illustrating a method of performing location determination by a user equipment.

FIG. 4 is a flow chart illustrating a method of performing location determination by a user equipment (UE), such as a target UE 102 show in FIGS. 1, 2, and 3. As illustrated in block 402, a ranging signal broadcast by each entity in a plurality of entities in a wireless network is received, e.g., as discussed at stages 4, 6, and 8 shown in FIG. 3. At block 404, a message with location information that is broadcast from each entity in the plurality of entities is received, e.g., as discussed at stages 9, 10, and 11 shown in FIG. 3. The message with the location information, for example, may be broadcast at a different time than the ranging signal. At block 406, a range to each entity is determined using the ranging signal received from each entity and the location information received from each entity, as discussed at stage 12 shown in FIG. 3. At block 408, a position of the user equipment is determined based on the range to each entity and a known location of each entity, e.g., as discussed at stage 13 shown in FIG. 3.

In one implementation, the plurality of entities comprise a cluster of entities that sequentially broadcast ranging signals, e.g., as discussed at stages 4, 6, and 8 shown in FIG. 3. For example, the sequentially broadcast ranging signals may be broadcast with no temporal overlap and using a same set of channels. A first ranging signal in the sequentially broadcast ranging signals may include an identification of the set of channels in a preamble that is determined by a first entity in the cluster of entities.

In one implementation, each ranging signal broadcast by each entity is a wideband waveform comprising multiple channels. The multiple channels may be contiguous or the multiple channels may not be contiguous.

In one implementation, each entity in the plurality of entities comprises one of a road side unit or a vehicle.

In one implementation, each message with the location information is received from each entity in an Intelligent Transport System (ITS) spectrum.

In one implementation, the location information broadcast by an entity may include at least one of the known location of the entity, a sequence identifier indicating a position of the entity in sequentially broadcasting the ranging signals, a time when the entity broadcast the ranging signal, or a combination thereof. In one implementation, for each entity, determining the range to the entity may use a time a ranging signal is received from the entity and the time when the entity broadcast the ranging signal received in the location information from the entity. In one implementation, for each entity, determining the time when the entity broadcast the ranging signal may use the sequence identifier received in the location information from the entity, and determining the range to the entity uses a time a ranging signal is received from the entity and the time when the entity broadcast the ranging signal determined using the sequence identifier.

Figure 5:
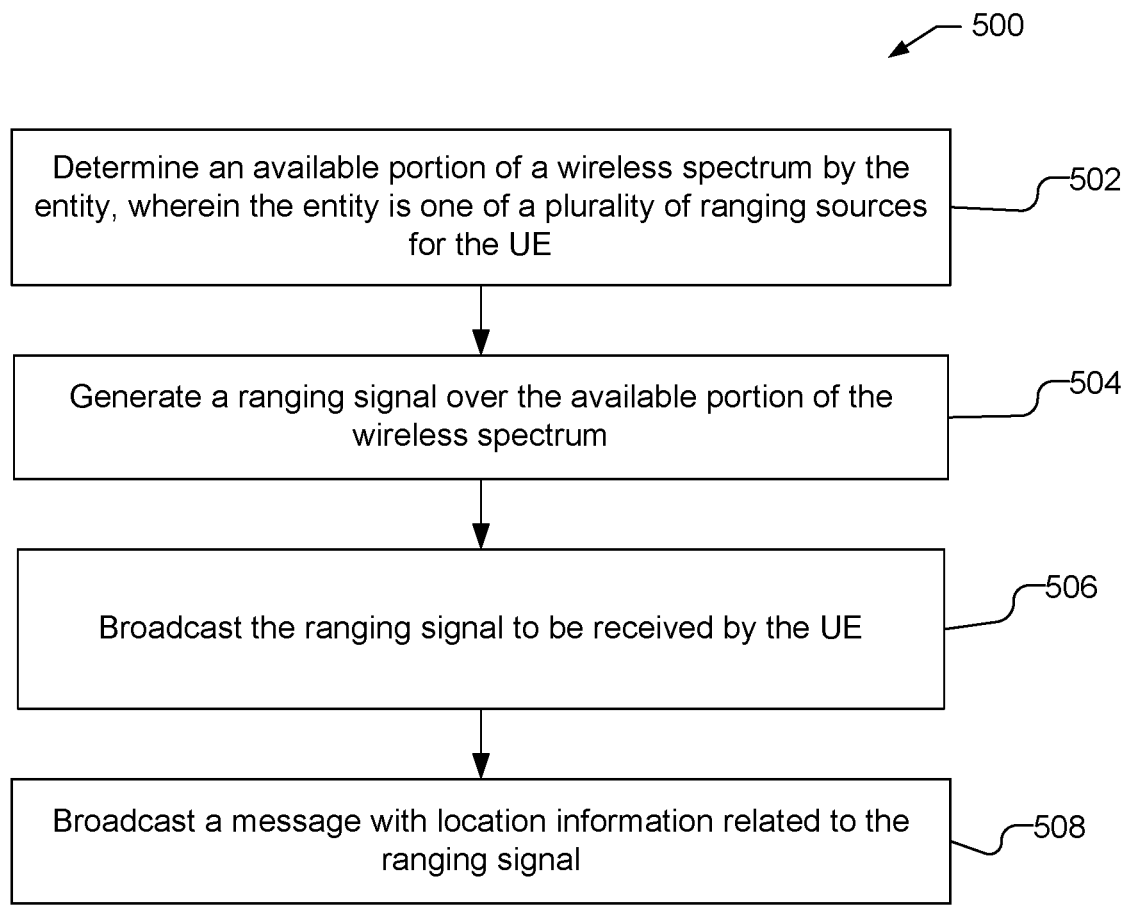
FIG. 5 a flow chart illustrating a method of supporting location determination of a user equipment by an entity in a wireless network.

FIG. 5 is a flow chart illustrating a method of supporting location determination of a user equipment (UE), such as target UE 102 shown in FIGS. 1, 2, and 3, performed by an entity in a wireless network, such as head SE 104-1 or SEs 104-2, 106 shown in FIGS. 1, 2, and 3. As illustrated at block 502, an available portion of a wireless spectrum is determined by the entity, wherein the entity is one of a plurality of ranging sources for the UE, as discussed at stages 3, 5, and 7 shown in FIG. 3. At block 504, a ranging signal is generated over the available portion of the wireless spectrum, e.g., as discussed at stages 3, 5, and 7 shown in FIG. 3. At block 506, the ranging signal to be received by the UE is broadcast, e.g., as discussed at stages 4, 6, and 8 shown in FIG. 3. At block 508, a message with location information related to the ranging signal is broadcast, e.g., as discussed at stages 9, 10, and 11 shown in FIG. 3. The message with the location information may be broadcast at a different time than the ranging signal.

In one implementation, the ranging signal is a wideband waveform comprising multiple channels. The multiple channels may be contiguous or the multiple channels may not be contiguous.

In one implementation, the plurality of ranging sources for the UE comprise a cluster of ranging sources that sequentially broadcast ranging signals. In one implementation, the sequentially broadcast ranging signals are broadcast with no temporal overlap and using a same set of channels. In one implementation, a first ranging signal in the sequentially broadcast ranging signals includes an identification of the set of channels in a preamble that is determined by a first ranging source in the cluster of ranging sources. In one implementation, for example, the entity may be a first ranging source in the plurality of ranging sources that sequentially broadcast ranging signals. In this example, the available portion of the wireless spectrum may be determined by detecting an energy level for different channels in the wireless spectrum, e.g., as discussed at stage 3 shown in FIG. 3. In this example, the ranging signal includes generating a preamble indicating a time over which the sequentially broadcast ranging signals will occur. In one implementation, for example, the entity broadcasts the ranging signal after receiving a ranging signal broadcast by a ranging source that immediately precedes the entity in the sequential broadcast of the ranging signals, e.g., as discussed at stage 5, 6 and 7, 8 shown in FIG. 3. In this example, the available portion of the wireless spectrum is determined by examining a waveform or a preamble of a ranging signal from a preceding ranging source, e.g., as discussed at stages 5 and 7 shown in FIG. 3.

In one implementation, the message with the location information related to the ranging signal may be broadcast in an Intelligent Transport System (ITS) spectrum.

In one implementation, the location information may include at least one of a location of the entity, a sequence identifier indicating a position of the entity in the plurality of ranging sources for the UE, a time when the entity broadcast the ranging signal, or a combination thereof.

In one implementation, the entity may be a road side unit or a vehicle.

Figure 6:
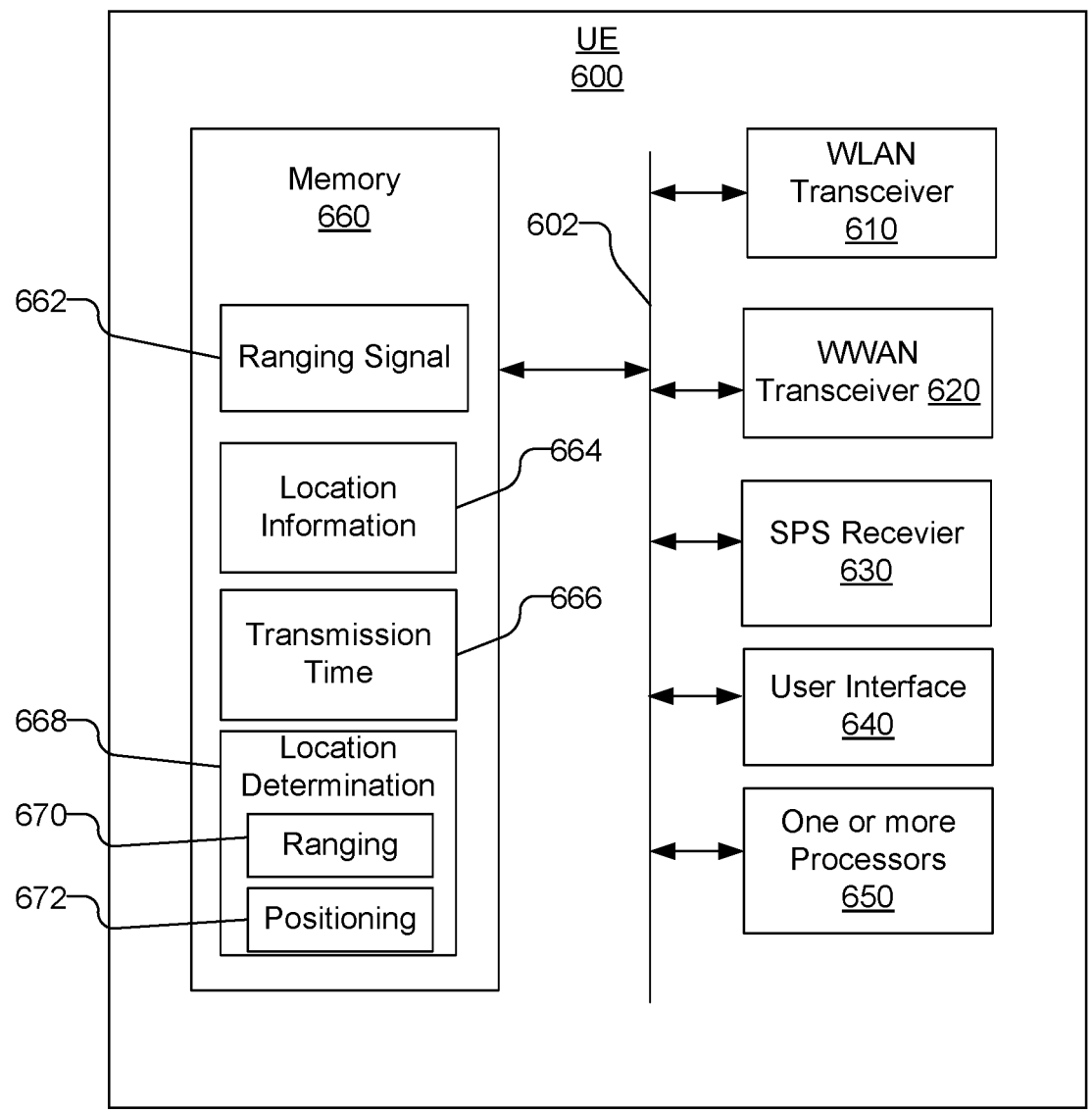
FIG. 6 is a diagram illustrating an example of a hardware implementation of a user equipment capable of performing location using sequentially broadcast ranging signal broadcast.

FIG. 6 is a diagram illustrating an example of a hardware implementation of a UE 600 capable of performing location using sequentially broadcast ranging signal as discussed herein. The UE 600, for example, may be the target UE 102 shown in FIGS. 1, 2, 3, and may be part of a vehicle or a pedestrian. The UE 600 includes a Wireless Wide Area Network (WWAN) transceiver 620, including a transmitter and receiver, such as a cellular transceiver, configured to receive PRS from base stations or SRS type ranging signals from other UEs, e.g., in vehicles or on pedestrians in the wireless network. The WWAN transceiver 620 may also be configured to wirelessly communicate directly with one or more ranging source entities (SEs) such as road side units and vehicles and to receive sequentially broadcast ranging signals and broadcast location information, e.g., using wireless communications under IEEE 802.11p on the ITS band of 5.9 GHz or other appropriate short range wireless communications. The UE 600 may further include a Wireless Local Area Network (WLAN) transceiver 610, including a transmitter and receiver, which may also be used to wirelessly communicate directly with other entities, and in some embodiments with ranging source entities. The UE 600 may further include an SPS receiver 630 with which SPS signals from SPS satellites, e.g., GPS or GNSS, may be received. The UE 600 may include additional features, such as user interface 640 that may include e.g., a display, a keypad or other input device, such as virtual keypad on the display, through which the user may interface with the UE 600.

The UE 600 further includes one or more processors 650 and memory 660, which may be coupled together with bus 602. The one or more processors 650 and other components of the UE 600 may similarly be coupled together with bus 602, a separate bus, or may be directly connected together or coupled using a combination of the foregoing. The memory 660 may contain executable code or software instructions that when executed by the one or more processors 650 cause the one or more processors 650 to operate as a special purpose computer programmed to perform the techniques disclosed herein. As illustrated in FIG. 6, the memory 660 may include one or more components or modules that may be implemented by the one or more processors 650 to perform the methodologies described herein. While the components or modules are illustrated as software in memory 660 that is executable by the one or more processors 650, it should be understood that the components or modules may be dedicated hardware either in the one or more processors 650 or off the processors.

The memory 660 may include ranging signal module 662 that when implemented by the one or more processors 650 configures the one or more processors 650 to cause the WWAN transceiver 620 to directly receive sequentially broadcast ranging signals from a set of SEs and to measure the TOA of each ranging signal from each SE, e.g., as discussed at stages 4, 6, and 8 in FIG. 3 and block 402 in FIG. 4.

Memory 660 may further include a location information module 664 that when implemented by the one or more processors 650 configures the one or more processors 650 to cause the WWAN transceiver 620 to directly receive a message with location information that is broadcast from each entity in the plurality of entities, e.g., as discussed at stages 9, 10, and 11 in FIG. 3 and block 404 in FIG. 4. In some implementations, the location information may be broadcast over a different spectrum, e.g., a licensed spectrum, than the spectrum used for the ranging signals, e.g., an unlicensed spectrum, although in some implementations, the location information and ranging signals may broadcast on the same spectrum. The location information for example, may include at least one of a location of the entity, a sequence identifier indicating a position of the entity in sequentially broadcasting of the ranging signals, a time when the entity broadcast the ranging signal, or a combination thereof.

Memory 660 may further include a location determination module 668 that when implemented by the one or more processors 650 configures the one or more processors 650 to estimate a position of the UE 600. For example, location determination module 668 may include a ranging module 670 that when implemented by the one or more processors 650 configures the one or more processors 650 to determine a range to each entity using the ranging signal received from each entity and the location information received from each entity, e.g., as discussed at stages 12 in FIG. 3 and block 406 in FIG. 4. For example, the range may be determined using a time a ranging signal is received from the entity and the time when the entity broadcast the ranging signal as received in the location information from the entity. In another example, the range may be determined by determining the time when the entity broadcast the ranging signal using the sequence identifier received in the location information from the entity, and then determining the range to the entity using a time a ranging signal is received from the entity and the time when the entity broadcast the ranging signal determined using the sequence identifier.

The location determination module 668 may also include a positioning module 672 that when implemented by the one or more processors 650 configures the one or more processors 650 to determine a position of the user equipment 600 based on the range to each entity and a known location of each entity, e.g., as discussed at stages 13 in FIG. 3 and block 408 in FIG. 4. For example, the positioning module 672 may configure the one or more processors 650 to determine the position of the user equipment 600 using trilateration based on the ranges to the entities and their positions as received in the location information. The positioning module 672 may further configure the one or more processors 650 to determine the position of the user equipment 600 using SPS signals 630 with the ranges to the entities and their positions as received in the location information.

Additionally, memory 660 may further include a transmission time module 666 that when implemented by the one or more processors 650 configures the one or more processors 650 to determine the time when the entity broadcast the ranging signal using the sequence identifier received in the location information from the entity, e.g., as discussed at stage 12 in FIG. 3.

The methodologies described herein may be implemented by various means depending upon the application. For example, these methodologies may be implemented in hardware, firmware, software, or any combination thereof. For a hardware implementation, the one or more processors 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 660) and executed by one or more processors 650, causing the one or more processors 650 to operate as a special purpose computer programmed to perform the techniques disclosed herein. Memory may be implemented within the one or processors 650 or external to the one or more processors 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 600 may be stored as one or more instructions or code on a non-transitory computer-readable storage medium such as memory 660. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 600 may be provided as signals on transmission media included in a communication apparatus. For example, a communication apparatus comprising part or all of UE 600 may include a transceiver having signals indicative of instructions and data. The instructions and data are stored on non-transitory computer readable media, e.g., memory 660, and are configured to cause the one or more processors 650 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 600, may include a means for receiving a ranging signal broadcast by each entity in a plurality of entities in a wireless network, which may be, e.g., the WWAN transceiver 620 and one or more processors 650 with dedicated hardware or implementing executable code or software instructions in memory 660 such as the ranging signal module 662. A means for receiving a message with location information that is broadcast from each entity in the plurality of entities may be, e.g., the WWAN transceiver 620 and one or more processors 650 with dedicated hardware or implementing executable code or software instructions in memory 660 such as the location information module 664. A means for determining a range to each entity using the ranging signal received from each entity and the location information received from each entity may be, e.g., the one or more processors 650 with dedicated hardware or implementing executable code or software instructions in memory 660 such as the ranging module 670. A means for determining a position of the user equipment based on the range to each entity and a known location of each entity may be, e.g., the one or more processors 650 with dedicated hardware or implementing executable code or software instructions in memory 660 such as the positioning module 672.

The user equipment may further include a means for determining the time when the entity broadcast the ranging signal using a sequence identifier received in the location information from the entity, which may be, e.g., the transmission time module 666.

Figure 7:
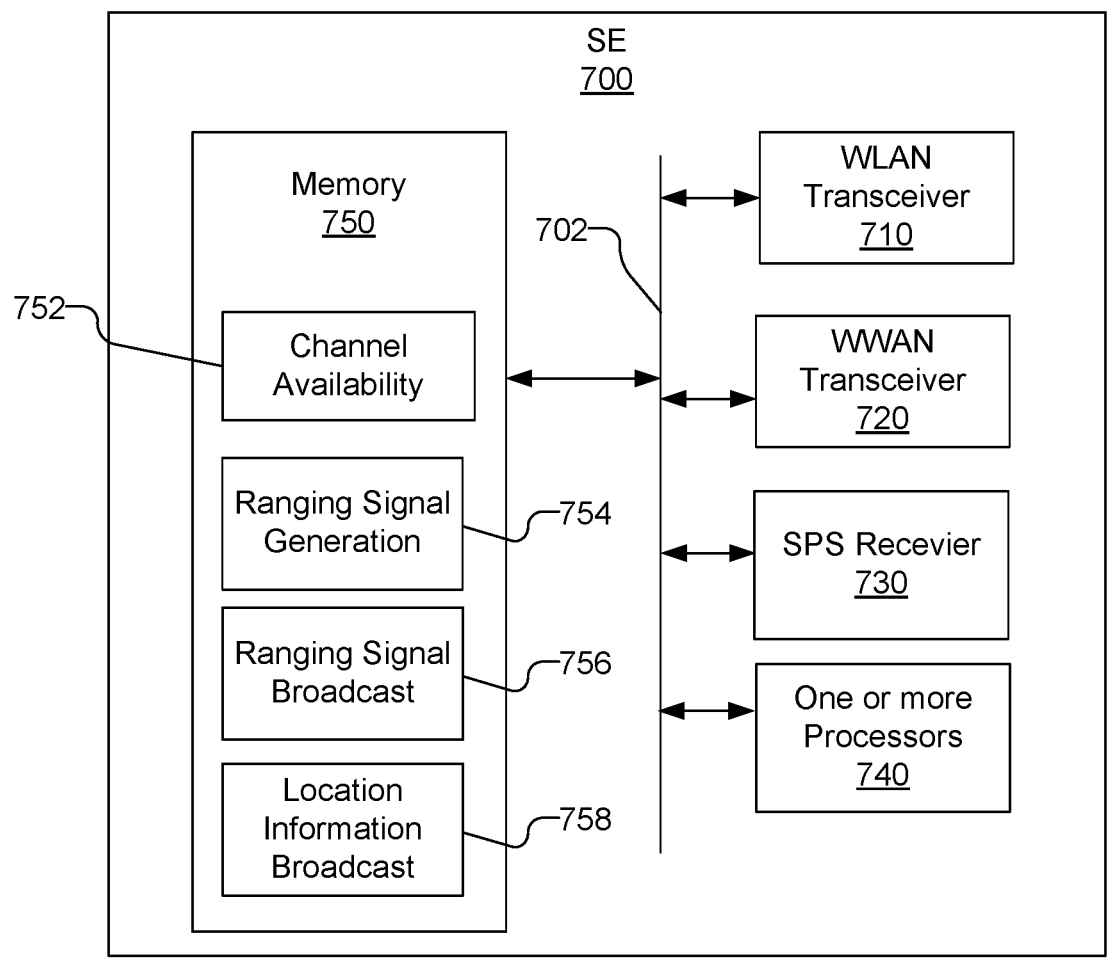
FIG. 7 is a diagram illustrating an example of a hardware implementation of a ranging source entity capable of supporting location determination of a user equipment using sequentially broadcast ranging signals.

FIG. 7 is a diagram illustrating an example of a hardware implementation of a ranging source entity (SE) 700 capable of supporting location determination of a user equipment (UE) using sequentially broadcast ranging signals as discussed herein. By way of example, the SE 700 may be a stationary entity, such as a road side unit, but alternatively may be a non-stationary entity, such as a vehicle, with a known position. The SE 700 includes a Wireless Wide Area Network (WWAN) transceiver 720, including a transmitter and receiver, such as a cellular transceiver, configured to wirelessly communicate directly with and broadcast ranging signals and location information to target UEs, e.g., using wireless communications under IEEE 802.11p on the ITS band of 5.9 GHz or other appropriate short range wireless communications. The SE 700 may further include a Wireless Local Area Network (WLAN) transceiver 710, including a transmitter and receiver, which may also be used to wirelessly communicate directly with other entities, and in some embodiments with UEs. The SE 700 may further include an SPS receiver 730 with which SPS signals from SPS satellites may be received and used to determine the position of the SE 700.

The SE 700 further includes one or more processors 740 and memory 750, which may be coupled together with bus 702. The one or more processors 740 and other components of the SE 700 may similarly be coupled together with bus 702, a separate bus, or may be directly connected together or coupled using a combination of the foregoing. The memory 750 may contain executable code or software instructions that when executed by the one or more processors 740 cause the one or more processors 740 to operate as a special purpose computer programmed to perform the techniques disclosed herein. As illustrated in FIG. 7, the memory 750 may include one or more components or modules that may be implemented by the one or more processors 740 to perform the methodologies described herein. While the components or modules are illustrated as software in memory 750 that is executable by the one or more processors 740, it should be understood that the components or modules may be dedicated hardware either in the one or more processors 740 or off the processors.

The memory 750 may include a channel availability module 752 that when implemented by the one or more processors 740 configures the one or more processors 740 to use WWAN transceiver 720 to determine an available portion of a wireless spectrum by the entity, wherein the entity is one of a plurality of ranging sources for the UE, e.g., as discussed at stages 3, 5, and 7 of FIG. 3 and block 502 of FIG. 5. For example, the available portion of the wireless spectrum may be determined by detecting energy level for different channels in the wireless spectrum as received by WWAN transceiver 720. In another example, the available portion of the wireless spectrum may be determined by examining a waveform or a preamble of a ranging signal from a preceding ranging source.

The memory 750 may include a ranging signal generation module 754 that when implemented by the one or more processors 740 configures the one or more processors 740 to generate a ranging signal over the available portion of the wireless spectrum, e.g., as discussed at stages 3, 5, and 7 of FIG. 3 and block 504 of FIG. 5. The ranging signal may be a wideband waveform with multiple channels, which may be contiguous or not contiguous. The one or more processors 740 may be configured to generate the ranging signal to include a preamble that indicates a time over which sequentially broadcast ranging signals will occur, e.g., as discussed at stages 3 of FIG. 3.

The memory 750 may include a ranging signal transmission module 756 that when implemented by the one or more processors 740 configures the one or more processors 740 to use WWAN transceiver 720 to broadcast the ranging signal to be received by the UE, e.g., as discussed at stages 4, 6, and 8 of FIG. 3 and block 506 of FIG. 5. The ranging signal, for example, may be broadcast over an unlicensed spectrum. The broadcast of the ranging signals may be part of sequential broadcasts of ranging signals by a plurality of SEs in a set of SEs, where the ranging signal is broadcast after receiving a ranging signal broadcast by a ranging source that immediately precedes the entity in the sequential broadcast of the ranging signals.

The memory 750 may include a location information transmission module 758 that when implemented by the one or more processors 740 configures the one or more processors 740 to use WWAN transceiver 720 to broadcast a message with location information related to the ranging signal, e.g., as discussed at stages 9, 10, and 11 of FIG. 3 and block 508 of FIG. 5. The location information, for example, may be broadcast in an Intelligent Transport System (ITS) spectrum. The location information may include at least one of a location of the entity, a sequence identifier indicating a position of the entity in the plurality of ranging sources for the IE, a time when the entity broadcast the ranging signal, or a combination thereof.

The methodologies described herein may be implemented by various means depending upon the application. For example, these methodologies may be implemented in hardware, firmware, software, or any combination thereof. For a hardware implementation, the one or more processors 740 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of SE 700 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 750) and executed by one or more processors 740, causing the one or more processors 740 to operate as a special purpose computer programmed to perform the techniques disclosed herein. Memory may be implemented within the one or processors 740 or external to the one or more processors 740. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by SE 700 may be stored as one or more instructions or code on a non-transitory computer-readable storage medium such as memory 750. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for SE 700 may be provided as signals on transmission media included in a communication apparatus. For example, a communication apparatus comprising part or all of SE 700 may include a transceiver having signals indicative of instructions and data. The instructions and data are stored on non-transitory computer readable media, e.g., memory 750, and are configured to cause the one or more processors 740 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a SE, such as SE 700, may include a means for determining an available portion of a wireless spectrum by the entity, wherein the entity is one of a plurality of ranging sources for the UE, which may be, e.g., the WWAN transceiver 720 and one or more processors 740 with dedicated hardware or implementing executable code or software instructions in memory 750 such as the channel availability module 752. A means for generating a ranging signal over the available portion of the wireless spectrum may be, e.g., the one or more processors 740 with dedicated hardware or implementing executable code or software instructions in memory 750 such as the ranging signal generation module 754. A means for broadcasting the ranging signal to be received by the UE may be, e.g., the WWAN transceiver 720 and one or more processors 740 with dedicated hardware or implementing executable code or software instructions in memory 750 such as the ranging signal broadcast module 756. A means for broadcasting a message with location information related to the ranging signal may be, e.g., the WWAN transceiver 720 and one or more processors 740 with dedicated hardware or implementing executable code or software instructions in memory 750 such as the location information broadcast module 758.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of performing location determination by a user equipment (UE), the method comprising:
   receiving sequentially broadcast ranging signals from a plurality of entities in a wireless network, wherein the plurality of entities comprise a cluster of entities, and wherein the sequentially broadcast ranging signals are broadcast with no temporal overlap and using the same set of channels, wherein a first ranging signal in the sequentially broadcast ranging signals includes and identification of the set of channels in a preamble that is determined by a first entity in the cluster of entities;
   receiving a message with location information that is broadcast from each entity in the plurality of entities, wherein the location information from an entity comprises timing information for a ranging signal broadcast by the entity and position information for the entity;
   determining a range to each entity using the ranging signal received from each entity and the timing information in the location information received from each entity; and determining a position of the user equipment based on the range to each entity and the position information in the location information received from each entity.

2. The method of claim 1, wherein each ranging signal broadcast by each entity of the plurality of entities is a wideband waveform comprising multiple channels.

3. The method of claim 2, wherein the multiple channels are contiguous.

4. The method of claim 2, wherein the multiple channels are not contiguous.

5. The method of claim 1, wherein each entity in the plurality of entities comprises a road side unit or a vehicle.

6. The method of claim 1, wherein each message with the location information is received from each entity in an Intelligent Transport System (ITS) spectrum.

7. The method of claim 1, wherein the position information broadcast by each entity comprises a known location of the entity, and the timing information broadcast by each entity comprises a sequence identifier indicating a position of the entity in sequentially broadcasting of the ranging signals, a time when the entity broadcast the ranging signal, or a combination thereof.

8. The method of claim 7, wherein for each entity, determining the range to the entity comprises using a time that a ranging signal is received from the entity and the time when the entity broadcast the ranging signal received in the location information from the entity.

9. The method of claim 7, further comprising, for each entity, determining the time when the entity broadcast the ranging signal comprises using the sequence identifier received in the location information from the entity, and determining the range to the entity comprises using a time that a ranging signal is received from the entity and the time when the entity broadcast the ranging signal determined using the sequence identifier.

10. A user equipment (UE) configured to support location determination comprising:
a wireless transceiver configured to receive broadcast signals from entities in a wireless network;
at least one memory; and
at least one processor coupled to the wireless transceiver and the at least one memory, the at least one processor configured to:
receive sequentially broadcast ranging signals from a plurality of entities in a wireless network, wherein the plurality of entities comprise a cluster of entities, and wherein the sequentially broadcast ranging signals are broadcast with no temporal overlap and using the same set of channels, wherein a first ranging signal in the sequentially broadcast ranging signals includes an identification of the set of channels in a preamble that is determined by a first entity in the cluster of entities;
receive a message with location information that is broadcast from each entity in the plurality of entities, wherein the location information from an entity comprises timing information for a ranging signal broadcast by the entity and position information for the entity;
determine a range to each entity using the ranging signal received from each entity and the timing information in the location information received from each entity; and
determine a position of the user equipment based on the range to each entity and the position information in the location information received from of each entity.

11. The UE of claim 10, wherein each ranging signal broadcast by each entity of the plurality of entities is a wideband waveform comprising multiple channels.

12. The UE of claim 11, wherein the multiple channels are contiguous.

13. The UE of claim 11, wherein the multiple channels are not contiguous.

14. The UE of claim 10, wherein each entity in the plurality of entities comprises a road side unit or a vehicle.

15. The UE of claim 10, wherein each message with the location information is received from each entity in an Intelligent Transport System (ITS) spectrum.

16. The UE of claim 10, wherein the position information broadcast by each entity comprises a known location of the entity, and the timing information broadcast by each entity comprises a sequence identifier indicating a position of the entity in sequentially broadcasting of the ranging signals, a time when the entity broadcast the ranging signal, or a combination thereof.

17. The UE of claim 16, wherein for each entity, the at least one processor is configured to determine the range to the entity using a time that a ranging signal is received from the entity and the time when the entity broadcast the ranging signal received in the location information from the entity.

18. The UE of claim 16, further comprising, for each entity, the at least one processor is further configured to determine the time when the entity broadcast the ranging signal uses the sequence identifier received in the location information from the entity, and the at least one processor is configured to determine the range to the entity uses a time that a ranging signal is received from the entity and the time when the entity broadcast the ranging signal determined using the sequence identifier.

19. A user equipment (UE) configured to support location determination comprising:
means for receiving sequentially broadcast ranging signals from a plurality of entities in a wireless network, wherein the plurality of entities comprise a cluster of entities, and wherein the sequentially broadcast ranging signals are broadcast with no temporal overlap and using the same set of channels, wherein a first ranging signal in the sequentially broadcast ranging signals includes an identification of the set of channels in a preamble that is determined by a first entity in the cluster of entities;
means for receiving a message with location information that is broadcast from each entity in the plurality of entities, wherein the location information from an entity comprises timing information for a ranging signal broadcast by the entity and position information for the entity;
means for determining a range to each entity using the ranging signal received from each entity and the timing information in the location information received from each entity; and
means for determining a position of the user equipment based on the range to each entity and the position information in the location information received from each entity.

20. The UE of claim 19, wherein each ranging signal broadcast by each entity of the plurality of entities is a wideband waveform comprising multiple channels.

21. The UE of claim 19, wherein the position information comprises a known location of the entity, and the timing information comprises a sequence identifier indicating a position of the entity in sequentially broadcasting of the ranging signals, a time when the entity broadcast the ranging signal, or a combination thereof, wherein for each entity, the means for determining the range to the entity uses a time that a ranging signal is received from the entity and the time when the entity broadcast the ranging signal received in the location information from the entity.

22. The UE of claim 19, wherein the position information comprises a known location of the entity, and the timing information comprises a sequence identifier indicating a position of the entity in sequentially broadcasting of the ranging signals, a time when the entity broadcast the ranging signal, or a combination thereof, wherein the UE further comprises means for determining the time when the entity broadcast the ranging signal using the sequence identifier received in the location information from the entity, and the means for determining the range to the entity uses a time that a ranging signal is received from the entity and the time when the entity broadcast the ranging signal determined using the sequence identifier.

23. A non-transitory computer readable medium including program code stored thereon, the program code is operable to configure at least one processor in a user equipment (UE) for performing location determination comprising:

program code to receive sequentially broadcast ranging signals from a plurality of entities in a wireless network, wherein the plurality of entities comprise a cluster of entities, wherein the sequentially broadcast ranging signals are broadcast with no temporal overlap and using the same set of channels, and wherein a first ranging signal in the sequentially broadcast ranging signals includes an identification of the set of channels in a preamble that is determined by a first entity in the cluster of entities;

program code to receive a message with location information that is broadcast from each entity in the plurality of entities, wherein the location information from an entity comprises timing information for a ranging signal broadcast by the entity and position information for the entity;

program code to determine a range to each entity using the ranging signal received from each entity and the timing information in the location information received from each entity; and program code to determine a position of the user equipment based on the range to each entity and the position information in the location information received from each entity.

24. The non-transitory computer readable medium of claim 23, wherein each ranging signal broadcast by each entity of the plurality of entities is a wideband waveform comprising multiple channels.

25. The non-transitory computer readable medium of claim 23, wherein the position information comprises a known location of the entity, and the timing information comprises a sequence identifier indicating a position of the entity in sequentially broadcasting of the ranging signals, a time when the entity broadcast the ranging signal, or a combination thereof, wherein for each entity, the program code to determine the range to the entity uses a time that a ranging signal is received from the entity and the time when the entity broadcast the ranging signal received in the location information from the entity.

26. The non-transitory computer readable medium of claim 23, wherein the position information comprises a known location of the entity, and the timing information comprises a sequence identifier indicating a position of the entity in sequentially broadcasting of the ranging signals, a time when the entity broadcast the ranging signal, or a combination thereof, the non-transitory computer readable medium further comprising, for each entity, program code to determine the time when the entity broadcast the ranging signal using the sequence identifier received in the location information from the entity, and the program code to determine the range to the entity uses a time that a ranging signal is received from the entity and the time when the entity broadcast the ranging signal determined using the sequence identifier.

\* \* \* \* \*